US008963764B1

(12) United States Patent
Gray et al.

(10) Patent No.: US 8,963,764 B1
(45) Date of Patent: Feb. 24, 2015

(54) SHIP HEADING AND PITCH USING SATELLITE EPHEMERIDES AND RADAR RANGE MEASUREMENT OF SATELLITE

(75) Inventors: Jack Gray, Point Pleasant, NJ (US); Jonathan A. Boardman, Mount Laurel, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 1077 days.

(21) Appl. No.: 13/007,244

(22) Filed: Jan. 14, 2011

(51) Int. Cl.
*G01S 13/00* (2006.01)
*G01S 5/02* (2010.01)
*G01S 13/95* (2006.01)

(52) U.S. Cl.
CPC .............. *G01S 5/0247* (2013.01); *G01S 13/956* (2013.01)
USPC ............. 342/41; 342/59; 342/147; 342/357.2

(58) Field of Classification Search
CPC ..... G01S 19/53; G01S 13/9307; G01S 19/31; G01S 19/45
USPC .................. 342/41, 126, 133, 357.25, 357.26
See application file for complete search history.

(56) References Cited

U.S. PATENT DOCUMENTS

| | | | |
|---|---|---|---|
| 3,735,942 A | 5/1973 | Palz | |
| 5,187,485 A | 2/1993 | Tsui et al. | |
| 5,543,804 A * | 8/1996 | Buchler et al. | 342/357.23 |
| 5,850,197 A * | 12/1998 | Schipper | 342/417 |
| 5,917,448 A * | 6/1999 | Mickelson | 342/442 |
| 6,133,870 A | 10/2000 | Wehner | |
| 6,246,363 B1 * | 6/2001 | Yung et al. | 342/357.29 |
| 6,463,366 B2 * | 10/2002 | Kinashi et al. | 701/13 |
| 6,650,287 B1 | 11/2003 | Karpov et al. | |
| 6,792,380 B2 * | 9/2004 | Toda | 702/151 |
| 7,292,185 B2 * | 11/2007 | Whitehead et al. | 342/357.36 |
| 7,315,274 B2 * | 1/2008 | Fossum | 342/44 |
| 7,451,022 B1 * | 11/2008 | Luk-Paszyc et al. | 701/13 |
| 7,468,695 B1 | 12/2008 | Williams | |
| 8,186,626 B1 | 5/2012 | Liu et al. | |
| 2003/0004640 A1 | 1/2003 | Vayanos | |
| 2003/0150959 A1 | 8/2003 | Cleveland | |
| 2005/0104763 A1 * | 5/2005 | Hall et al. | 342/25 A |
| 2007/0252044 A1 | 11/2007 | Jackson et al. | |
| 2007/0285304 A1 | 12/2007 | Cooper | |
| 2009/0093959 A1 * | 4/2009 | Scherzinger et al. | 701/215 |
| 2010/0019956 A1 | 1/2010 | Samaniego et al. | |
| 2010/0109944 A1 * | 5/2010 | Whitehead et al. | 342/357.03 |
| 2010/0164789 A1 * | 7/2010 | Basnayake | 342/357.04 |
| 2010/0226448 A1 | 9/2010 | Dent | |
| 2011/0084870 A1 * | 4/2011 | Kondo et al. | 342/41 |
| 2011/0267223 A1 * | 11/2011 | Jin et al. | 342/25 F |

OTHER PUBLICATIONS

P.S. Maybeck, Stochastic Models, Estimation, and Control, vol. 1, Academic Press, pp. 1-16, 1979.
S. Bhattacharya, et al., An Evaluation of the Tight Optical Integration (TOI) Algorithm Sensitivity to Inertial and Camera Errors, IEEE/ION Position, Location and Navigation Symposium, pp. 533-540, May 2008.

* cited by examiner

*Primary Examiner* — John B Sotomayor
*Assistant Examiner* — Marcus Windrich
(74) *Attorney, Agent, or Firm* — Howard IP Law Group, PC (57) ABSTRACT

There may be situations in which a ship at sea is lost and GPS is not available due to jamming, and neither a position fix nor GPS is available, or the heading and attitude sensors are degraded. A system and method allow estimating a ship's heading and pitch using radar range measurements, multiple antennas and satellite ephemeris data.

18 Claims, 7 Drawing Sheets

SHIP HEADING AND PITCH USING SATELLITE EPHEMERIDES AND RADAR RANGE MEASUREMENT OF SATELLITE

BACKGROUND

It is important for at least navigational purposes for a moving or movable vehicle to know its heading and/or pitch. In the case of a ship at sea, there may be situations in which the ship is lost and there are no landmarks in sight. In a battle zone, there may be situations in which a ship at sea has damaged heading and/or attitude sensors, or in which the sensors are severely degraded due to man-made or natural anomalies. For example, it is well known that the earth's electromagnetic magnetic field has an extreme effect on magnetic sensors as a ship approaches the earth's poles.

Improved or alternative arrangements are desired for heading and/or pitch determinations.

SUMMARY

A method is for determining at least one of heading and pitch of a movable platform such as a ship. This method comprises the step of operating a radar system mounted at forward and aft positions on the movable platform, where the forward and aft positions define a baseline, to measure the ranges of at more than two satellites. Ephemerides for the satellites are obtained. Using a computer and the satellite ephemerides, delta-range equations are set up expressing a baseline vector in terms of the range measurements. A least squares solution is obtained for the heading and pitch using the delta-range equations and the range measurements from the forward and aft locations.

A system for determining at least one of heading and pitch of a movable platform comprises a radar arrangement mounted at forward and aft positions on the movable platform, where the forward and aft positions define a baseline. The radar arrangement is operable to measure the ranges of at least two satellites from the forward and aft positions. Sources are provided of ephemerides for the satellites and estimates of the heading and/or pitch. A computer is coupled to the radar arrangement, and to the sources of satellite ephemerides and estimates, for setting up delta-range equations expressing a baseline vector in terms of the range measurements, and for obtaining a least squares solution for the heading and pitch using the delta-range equations and the range measurements from the forward and aft locations.

A method for determining at least one of heading and pitch of a movable platform, where the movable platform carries a first radar arrangement including an antenna located at one of forward-located and aft-located positions and also carries a second radar arrangement including an antenna located at the other one of the forward-located and aft-located positions. The method comprises the step of measuring the range to at least two Earth satellites from the first and second radar arrangements, to form measured ranges. The method also comprises the steps of obtaining ephemeris data for the satellites and obtaining an initial estimate of heading and pitch. In a computer process, the method calculates an estimated vector representing a baseline extending between the forward- and aft-located positions, and calculates estimated range differences between the satellites and the forward and aft locations. A geometry matrix is formed from the satellite-ship geometry. A Jacobian matrix is formed representing variation in the baseline vector as a function of the heading and pitch. An incremental solution for heading and pitch is obtained using the geometry matrix, Jacobian matrix and range measurements. The incremental position is solved, and the estimate of heading and pitch is updated.

A system for determining heading and pitch of a movable platform comprises a radar system located on the movable platform at one of a forward-located and an aft-located position. The movable platform also carries a radar receiver located at the other one of the forward-located and aft-located positions. The radar system and receiver measure the ranges to at least two Earth satellites from the radar and receiver, respectively, to form measured ranges. Sources are provided of satellite ephemeris data and of estimate of heading and pitch. The system further includes a computer or processor for, in a computer process, calculating the estimated baseline vector extending between the forward and aft positions, and estimated range differences between the satellites and the forward and aft locations. In the computer process, a geometry matrix is formed from satellite-ship geometry. A Jacobian matrix is formed representing variation in the baseline vector as a function of the estimated range. In the computer process, an incremental solution for heading and pitch is formed, and the estimated heading and pitch are updated by the incremental solution.

A method for determining at least one of heading and pitch of a movable platform carrying a radar system located at one of a forward and aft position on the platform and a radar signal receiver located at the other of the forward and aft position. The method comprises the step of, using both the forward- and aft-located systems, determining the range and range rate of at least two Earth-orbiting satellites. Satellite ephemerides are obtained. Using a computer, range and range rate equations are generated from data originating from the forward-located and aft-located radar and receiver systems, to thereby generate forward and aft range equations and forward and aft range rate equations. The difference is taken between the forward and aft range equations to thereby form a difference range equation. The difference is taken between the forward and aft rate equations to thereby form a difference rate equation. The forward and aft range and range rate equations are solved simultaneously to determine the heading and pitch. In a particular mode of this method, the step of simultaneously solving includes the steps of applying a least-squares simultaneous solution.

DETAILED DESCRIPTION

Figure 1A:
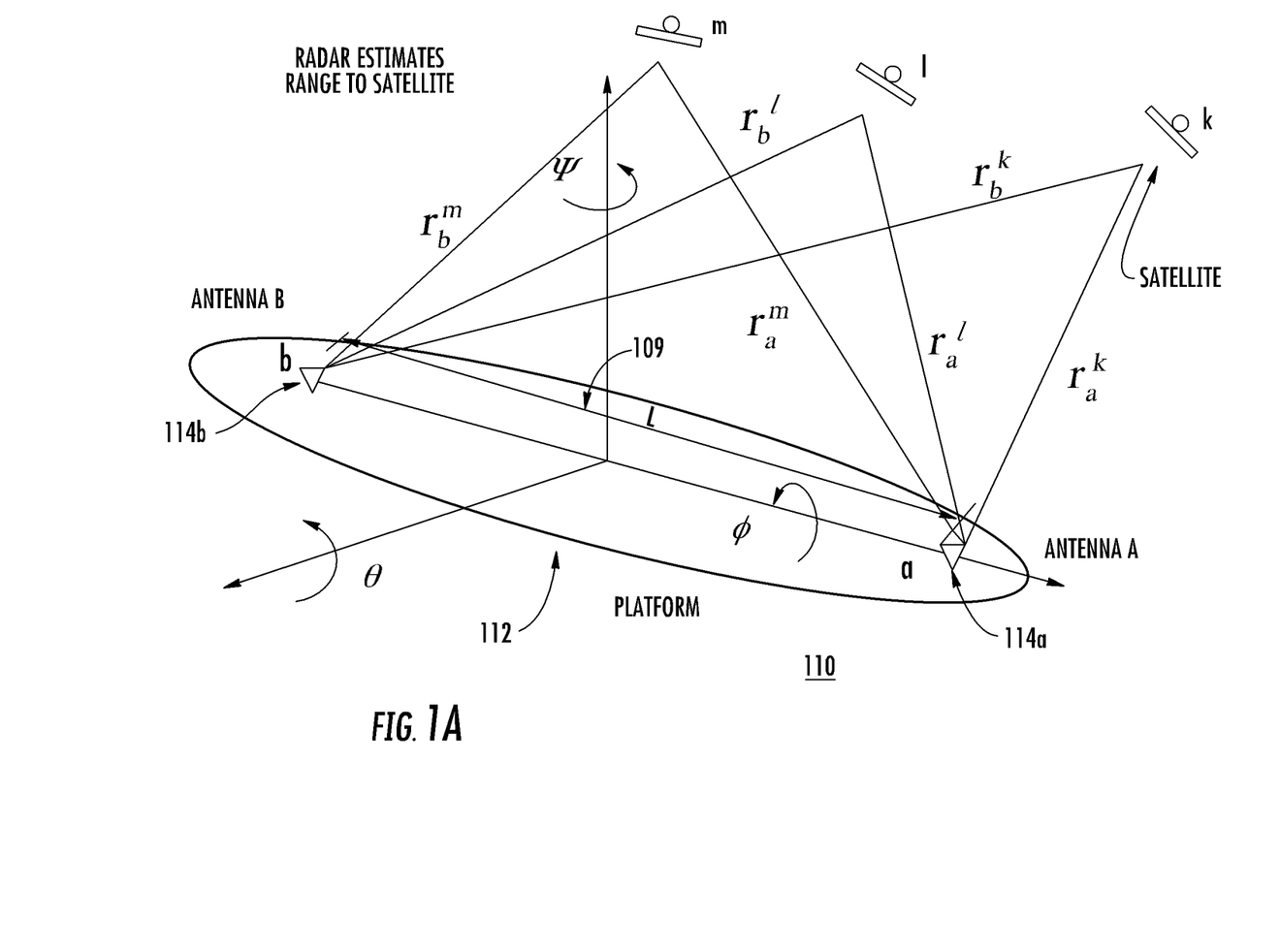
FIGS. 1A and 1B together constitute a simplified representation of a ship at sea illuminating a plurality of satellites with forward-located radar system and receiving radar signals from the satellites with an aft-located radar receiver, and including a computer, for ship heading and pitch) determination according to an aspect of the disclosure.
Figure 1B:
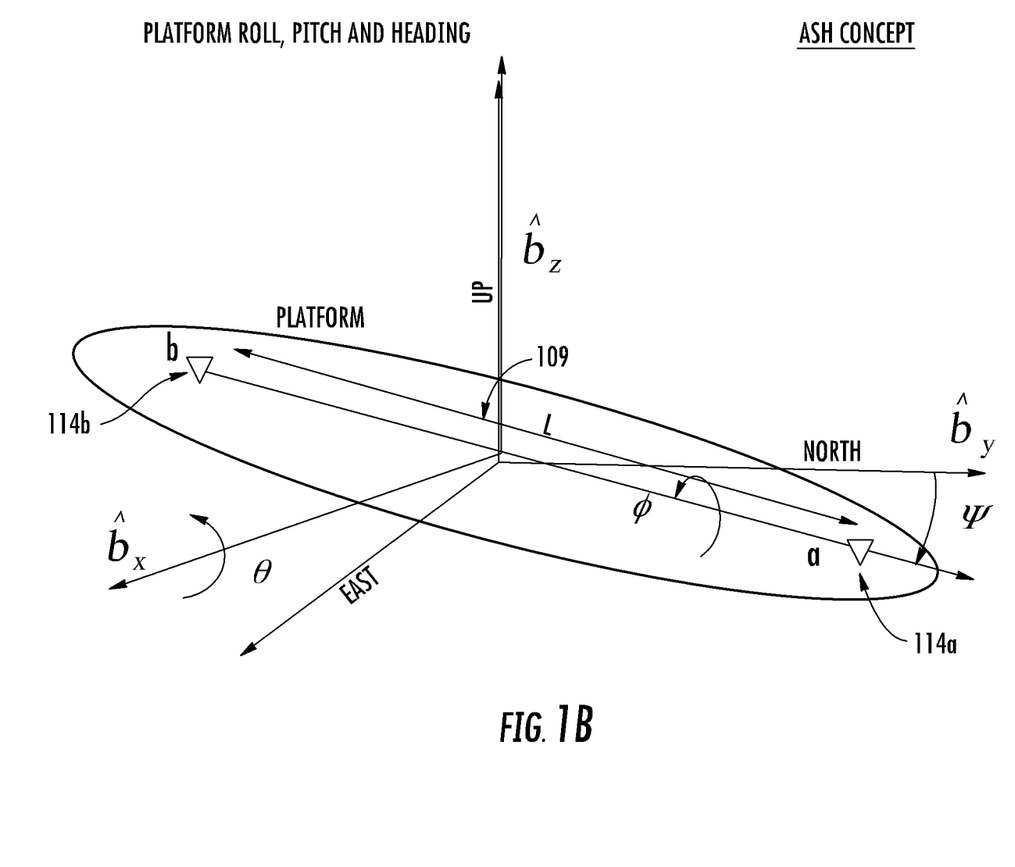

As mentioned, there may be situations when a ship at sea has damaged heading and attitude sensors, or where the sensors are severely degraded due to man-made or natural anomalies. For example, it is well known that the earth's electromagnetic magnetic field has an extreme effect on magnetic sensors as a ship approaches the earth's poles. A system to determine ship heading and pitch according to an aspect of the disclosure uses the ship's radar range measurements, satellite ephemeris data and a remote passive radar sensor (antenna) tuned to the same radar frequency as the ship's active radar (or a second active radar system) to determine a ship's heading and pitch α with the aid of a computer and algorithms. The system can be self-contained, in that it may be independent of external (off-ship) sensors or transmissions, and also independent of the earth's magnetic field. FIGS. 1A and 1B together constitute a simplified representation of a ship 112 at sea 110. Ship 112 has an active radar system, the antenna of which is at a location designated 114a. For simplicity, the radar antenna at location 114a is given the designation "114a." Radar antenna 114a is capable of transmitting radar signals, and bouncing them from satellites within range of the radar to measure ranges. Ship 112 also has another sensor or radar antenna, located at a point 114b, which is aft of point 114a; the sensor or antenna is designated as "114b." Antenna 114b is also capable of receiving the radar returns bouncing from the satellite. Point 114b is located at a fixed distance L from the active radar antenna 114a, and a line 109 extending therebetween is termed a "baseline". The ship's heading is depicted as ψ, pitch as θ, and roll as φ. The ship's heading and pitch can be determined, according to an aspect of the disclosure, using radar information together with satellite ephemeris data.

FIG. 1A illustrates three satellites denominated k, l, and m. The range or distance from radar location 114a is designated by a subscript a, and the range from radar location 114b is designated by a subscript b. Thus, the distance or range between satellite k and radar at location 114a is designated $r_a^k$, the distance or range between satellite k and radar receiver location 114b is designated $r_b^k$, the distance or range between satellite l and radar location 114a is given as $r_a^l$, the distance or range between radar receive location 114b is designated $r_b^l$, the distance or range between satellite m and radar location 114a is designated $r_a^m$, and the distance or range between satellite m and receive location 614b is designated $r_b^m$.

Figure 2:
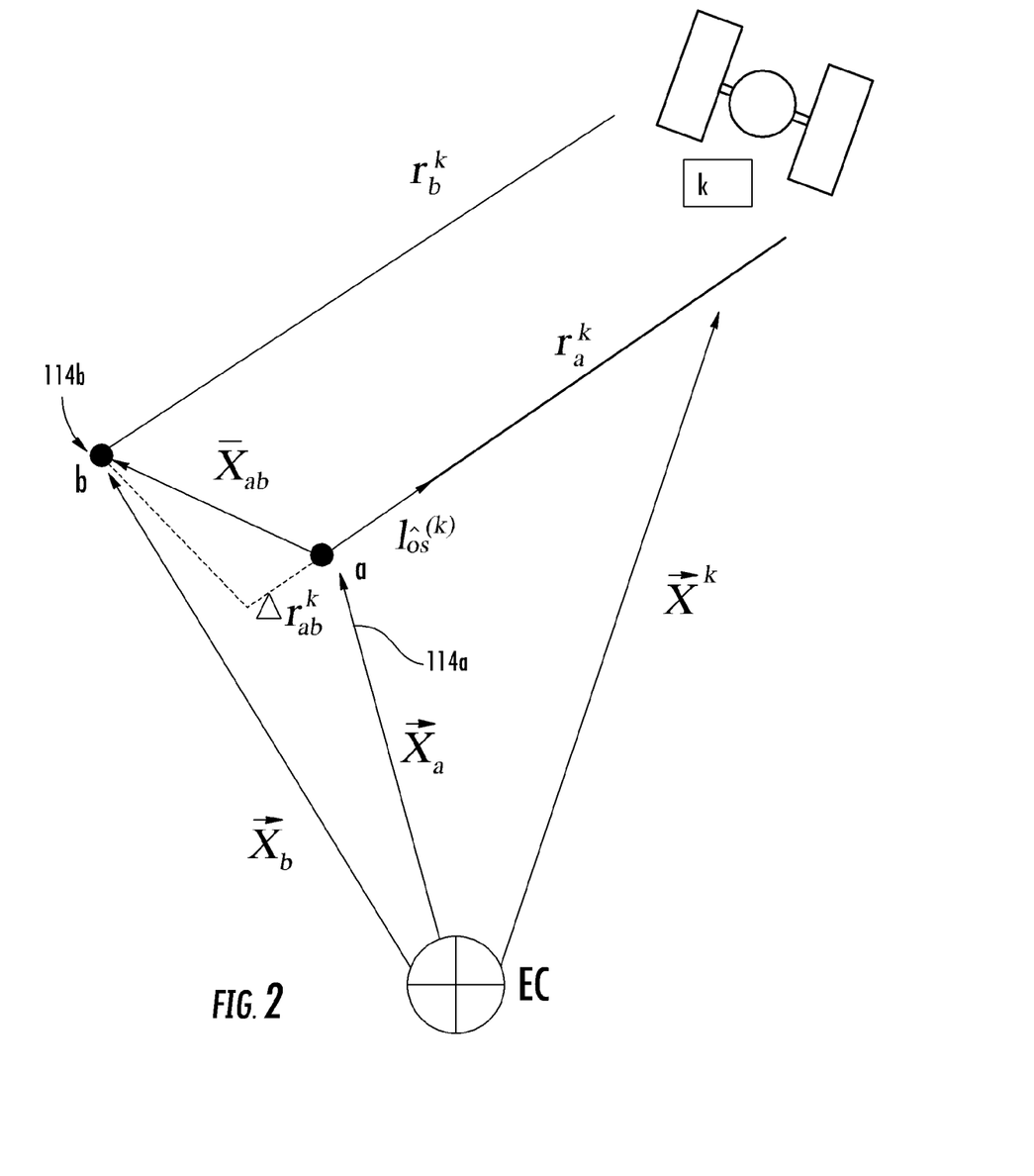
FIG. 2 is a geometry representation relating to the scenario of FIGS. 1A and 1B.

FIG. 2 illustrates geometry associated with the determination of the ship heading and pitch reference according to aspects of the disclosure. In FIG. 2, the gravitational center of the Earth is designated EC. For a ship with antennas at forward and aft locations 114a and 114b of FIG. 1A or 1B, the baseline 109 vector $\vec{x}_{ab}$ connecting the two antennas as in FIG. 2 can be solved for by using radar range measurements from the two antennas. Baseline vector $\vec{x}_{ab}$ of FIG. 2 is known in the vehicle body frame coordinates, which body frame coordinates are defined by unit vectors $\hat{b}_x$, $\hat{b}_y$, and $\hat{b}_z$ of FIG. 1B. Obtaining this vector in the vehicle navigation frame (coordinates North, East, Up) allows the heading to be determined. Calculation of this baseline vector in the vehicle navigation frame is accomplished by utilizing the difference in range measurements from the two antennas. The geometry between a satellite and the baseline orientation is shown in FIG. 2. The range difference $\Delta r_{ab}^{(k)}$ is the projection of the negative of the line of sight unit vector $l\hat{o}s^{(k)}$ onto the baseline vector $\hat{x}_{ab}$. The range difference is $$\Delta r_{ab}^{(k)} = r_a^{(k)} - r_b^{(k)} = -l\hat{o}s^{(k)} \cdot \hat{x}_{ab}^{(k)} \quad \text{Eq 1}$$

Because the range of the satellite is much greater than the baseline length, the line-of-sight direction from each antenna to the satellite being measured is assumed to be the same.

For N range measurements, where N is greater than three (N>=3), Equation 1 can be written in vector form as equation 2

$$\Delta \vec{r}_{ab} = \begin{bmatrix} \Delta \vec{r}_{ab}^{(1)} \\ \Delta \vec{r}_{ab}^{(2)} \\ \vdots \\ \Delta \vec{r}_{ab}^{(N)} \end{bmatrix} = \begin{bmatrix} -l\hat{o}s^{(1)T} \\ -l\hat{o}s^{(2)T} \\ \vdots \\ -l\hat{o}s^{(N)T} \end{bmatrix} \cdot \vec{x}_{ab} \quad \text{Eq 2}$$

The matrix on the right side of Equation 2 is the geometry matrix G. Equation 2 can be re-written as $$\Delta \hat{r}_{ab} = G \cdot \hat{x}_{ab} \quad \text{Eq 3}$$

The matrix G can be determined using the ship's position together with satellite ephemeris data. The matrix G expresses the line-of-sight vectors pointing from the ship position to each satellite. Eq. 3 is a linear equation with three unknowns, namely the three components of three-dimensional baseline vector $\hat{x}_{ab}$, $[\hat{x}_{ab}^{(1)} \hat{x}_{ab}^{(2)} \hat{x}_{ab}^{(3)}]$. In the case in which measurements are available from three or more satellites, $\hat{x}_{ab}$ can be obtained using a least squares solution.

$$\hat{x}_{ab} = (G^T W^{-1} G)^{-1} G^T W^{-1} \Delta \hat{r}_{ab} \quad \text{Eq 4}$$

where W is a weight matrix used in case more accurate measurements are to be favored over less accurate measurements. Weight W can be selected to be the covariance of the delta-range measurements $$W = \text{diag}[\sigma_{\Delta r 1}^2 \sigma_{\Delta r 2}^2 \ldots \sigma_{\Delta r 3}^2] \quad \text{Eq. 5}$$

where $\sigma_{\Delta ri}^2$ represents the uncertainty in the delta-range measurement for satellite i.

Equation 4 solves for the vector $\vec{x}_{ab}$ in the navigation reference frame. Since this vector is also known in the vehicle body frame, the heading of the ship can be determined. If the antennas are located on the roll axis (φ), the heading Ψ and pitch θ can be determined as follows, referring to FIGS. 1A and 1B.

$$\psi = \tan^{-1}\left(\frac{\vec{x}_{ab}(1)}{\vec{x}_{ab}(2)}\right) \quad \text{Eq 6}$$

$$\theta = \sin^{-1}(\vec{x}_{ab}(3)) \quad \text{Eq 7}$$

where the parenthetical numbers 1, 2, and 3 refer to the components of the baseline vector. If the antennas are located off the roll axis, pitch and roll will be coupled and only heading will be observable.

The above discussion relates to determination of heading and pitch for the case of N range measurements, where N is greater than three (N≥3), thus requiring the presence of at least three satellites on which to make measurements. The determination of ship heading and pitch with only N=2 satellites is described next. In the case that only two range measurements are available in the context of the scenario of FIGS. 1A and 1B, ship heading and pitch can still be determined, even though the full ship attitude cannot. FIG. 1B further defines the ENU axes and unit coordinate vectors $\hat{b}_x$, $\hat{b}_y$, $\hat{b}_z$ attached to the ship's body. Referring to FIG. 1B, if the two antennas 114a and 114b are located on the vehicle roll axis φ, the baseline vector in the East-North-Up (ENU) frame can be expressed as shown in Equation 8, where L is the length of the baseline.

$$\vec{x}_{ab} = L \begin{bmatrix} \sin\psi\cos\theta \\ \cos\psi\cos\theta \\ \sin\theta \end{bmatrix} \quad \text{Eq 8}$$

The unit vectors $\hat{b}_x, \hat{b}_y, \hat{b}_z$ of FIG. 1B represent a coordinate frame attached to the ship body. Rotation about $\hat{b}_x$ is the pitch $\theta$, and rotation about $\hat{b}_y$ is the roll $\phi$. In the case of a ship at sea, the heading can be calculated as the angle between North and $\hat{b}_y$. If the antennas are located off the roll axis, then the angle $\theta$ will include components of pitch and roll, and only the heading can be determined. To solve for heading $\psi$ and pitch $\theta$, Equation 8 can be linearized and the solution obtained iteratively. The variation of $\vec{x}_{ab}$ will have the form $$\delta\vec{x}_{ab} = \begin{bmatrix} \frac{\partial\vec{x}_{ab}(1)}{\partial\psi} & \frac{\partial\vec{x}_{ab}(1)}{\partial\theta} \\ \frac{\partial\vec{x}_{ab}(2)}{\partial\psi} & \frac{\partial\vec{x}_{ab}(2)}{\partial\theta} \\ \frac{\partial\vec{x}_{ab}(3)}{\partial\psi} & \frac{\partial\vec{x}_{ab}(3)}{\partial\theta} \end{bmatrix} \begin{bmatrix} \delta\psi \\ \delta\theta \end{bmatrix} \quad \text{Eq 9}$$

Applying this to Equation 8 results in $$\delta\vec{x}_{ab} = \begin{bmatrix} \cos\theta\cos\psi & -\sin\psi\sin\theta \\ -\cos\theta\sin\psi & -\cos\psi\sin\theta \\ 0 & \cos\theta \end{bmatrix} \begin{bmatrix} \delta\psi \\ \delta\theta \end{bmatrix} \quad \text{Eq 10}$$

or $$\delta\vec{x}_{ab} = J \begin{bmatrix} \delta\psi \\ \delta\theta \end{bmatrix} \quad \text{Eq 11}$$

Defining the difference between the measured and predicted delta ranges $\delta\Delta\vec{r}_{ab} \equiv \Delta\vec{r}_{ab}$, the delta range equation (Equation 3) can be expressed in differential form $$\delta\Delta\vec{r}_{ab} = G \cdot \delta\vec{x}_{ab} \quad \text{Eq 12}$$

Substituting for $\delta\vec{x}_{ab}$ from Equation 11 results in $$\delta\Delta\vec{r}_{ab} = GJ \begin{bmatrix} \delta\psi \\ \delta\theta \end{bmatrix} \quad \text{Eq 13}$$

Figure 3:
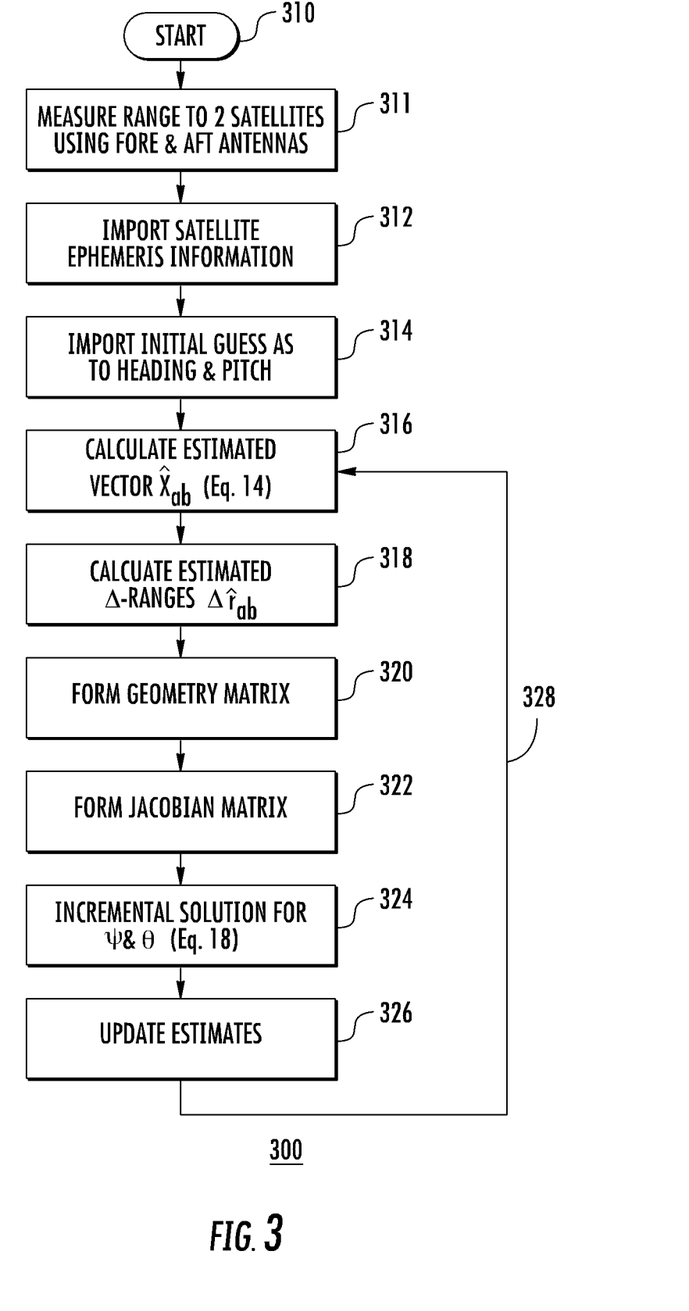
FIG. 3 is a simplified control or logic flow chart or diagram illustrating system steps according to an aspect of the disclosure.

A solution is obtained iteratively. The steps are set forth below in conjunction with the logic flow chart or diagram 300 of FIG. 3. In FIG. 3, the logic begins at a START block 310, and flows to a block 311. Block 311 represents the measuring of the range to the two satellites using the forward and aft antennas at locations 614a and 614b. From block 311, the logic 300 flows to a block 312. Block 312 represents the importation of satellite ephemeris data. The logic 300 flows to a block 314, which represents the importing or generation of an initial guess as to the values for $\psi$ and $\theta$, namely heading $\hat{\psi}$ and pitch $\hat{\theta}$. From block 314, the logic 300 flows to a block 316. Block 316 represents calculation of the estimated vector $\hat{x}_{ab}$ extending between antennas 114a and 114b $$\hat{x}_{ab} = L \begin{bmatrix} \sin\hat{\psi}\cos\hat{\theta} \\ \cos\hat{\psi}\cos\hat{\theta} \\ \sin\hat{\theta} \end{bmatrix} \quad \text{Eq 14}$$

From block 316, the logic 300 flows to a block 318. Block 318 represents calculation of estimated delta-ranges, which is the difference in range between antennas 114a and 114b to each satellite $$\Delta\hat{r}_{ab} = \begin{bmatrix} \|\hat{x}_a - \vec{x}^{(1)}\| - \|\hat{x}_b - \vec{x}^{(1)}\| \\ \|\hat{x}_a - \vec{x}^{(2)}\| - \|\hat{x}_b - \vec{x}^{(2)}\| \end{bmatrix} \quad \text{Eq 15}$$

Block 320 represents determination or formation of the Geometry matrix, as shown in Equation 3.

$$G = G(\hat{x}_a, \hat{y}_a, \hat{z}_a) \quad \text{Eq 16}$$

The Jacobian matrix is formed in logic block 322, as shown in Equation 10.

$$J = J(\hat{\psi}, \hat{\theta}) \quad \text{Eq 17}$$

Since the product of G and J is square (2×2) and is full rank, the incremental solution can be obtained by taking the inverse of the product $$\begin{bmatrix} \delta\psi \\ \delta\theta \end{bmatrix} = (GJ)^{-1} \delta\Delta\vec{r}_{ab} \quad \text{Eq 18}$$

This incremental solution for heading $\psi$ and pitch $\theta$ is calculated in block or step 324 of FIG. 3. From block 324, the logic flows to a block 326, representing the updating of the estimates $$\hat{\psi}^+ = \hat{\psi}^- + \delta\psi$$

$$\hat{\theta}^+ = \hat{\theta}^- + \delta\theta \quad \text{Eq 19}$$

The logic 300 of FIG. 3 flows from block 326 by way of a logic path 328 back to step 316. The logic flows around the logic loop using the updated estimates at each iteration. The iteration may be ended in known manners upon convergence.

Figure 4:
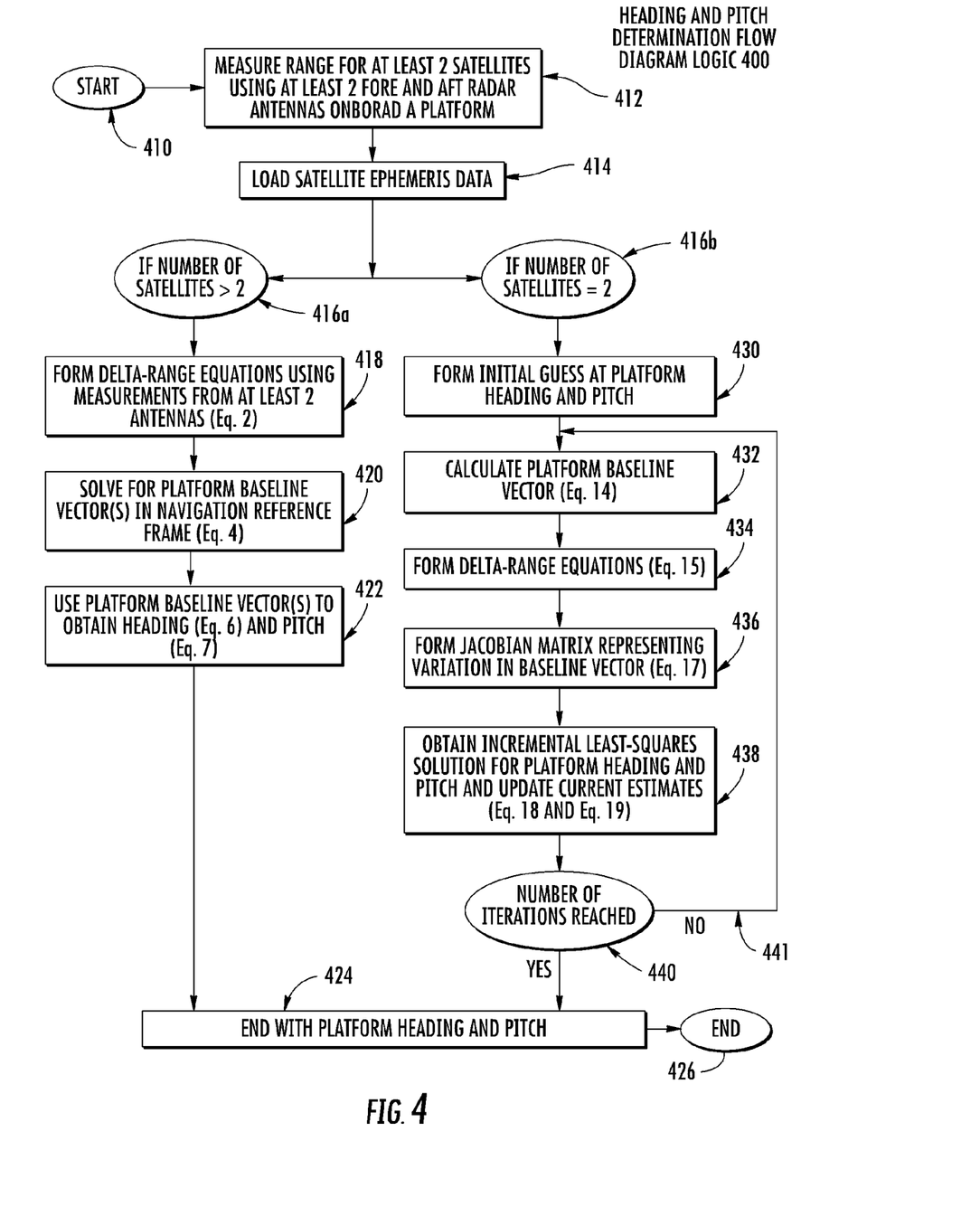
FIG. 4 is a simplified overall logic flow chart or diagram illustrating steps according to an aspect of the disclosure.

FIG. 4 is a simplified overall control or logic flow chart or diagram illustrating steps in the determination of ship heading and pitch. In FIG. 4, the logic 400 begins at a START block 410, and flows to a block 412, which represents measuring the range to at least two satellites using at least the two antennas 614a and 614b of FIGS. 1A and 1B on board the platform or ship 12, the heading and pitch of which are to be determined. From block 412, the logic 400 flows to a block 414, representing the loading of satellite ephemerides information. From block 414, the logic flows to a decision block illustrated as parts or portions 416a and 416b. Decision block portion 416a routes the logic to a block 418 if the number of satellites for which range measurements have been made exceeds two, while decision block portion 416b routes the logic to block 430 if the number of satellites is two.

Block 418 in the 3-satellite portion (>2) of the logic flow 400 of FIG. 4 represents formation of delta-range equations (equation 2) from at least the two antennas. From block 418, logic 400 flows to a block 420. Block 420 represents the use of geometry equations (equation 4) to solve for the platform baseline vector(s) in the navigation reference frame. Block 422 represents determination of the heading $\psi$ and pitch $\alpha$ from the platform baseline vector(s) (Equations 6 and 7).

In the two-satellite portion (=2) of the flow chart 400 of FIG. 4, the logic proceeds from decision block portion 416b to a block 430. Block 430 of logic 400 of FIG. 4 represents the formation of an initial estimate or guess as to platform pitch $\hat{\theta}$ and heading $\hat{\psi}$, and corresponds to block 314 of FIG. 3. Block 432 of FIG. 4 represents calculation of the platform baseline vector using equation 14, and corresponds to block 316 of FIG. 3. Block 434 of FIG. 4 represents formation of the delta-range equations 15, corresponding to block 318 of FIG. 3. At this point in the processing, it is assumed that position is known, and therefore G is also known. Block 436 of FIG. 4 represents the formation of the Jacobian matrix (Equation 17) representing the variation in the baseline vector, and corresponds to block 322 of FIG. 3. Block 438 of FIG. 4 represents the obtainance of an incremental least-squares solution for platform heading and pitch (equation 18), and the updating of the current estimates, corresponding to blocks 324 and 326 of FIG. 3. From block 438 of FIG. 4, the logic 400 flows to a decision block 440. Block 440 determines if the number of iterations has reached a limit value. If the number of iterations has not reached a limit value, the logic 400 leaves decision block 440 by the NO output and returns by a logic path 441 to block 432, to begin another iteration. Eventually, the number of iterations will have reached the limit value, and the logic will leave decision block 440 by the YES output. From either block 422 or 440 the logic will reach block 424. Block 424 represents the end state of the process, namely with platform heading and pitch. The logic 400 ends at an END block 426.

Figure 5:
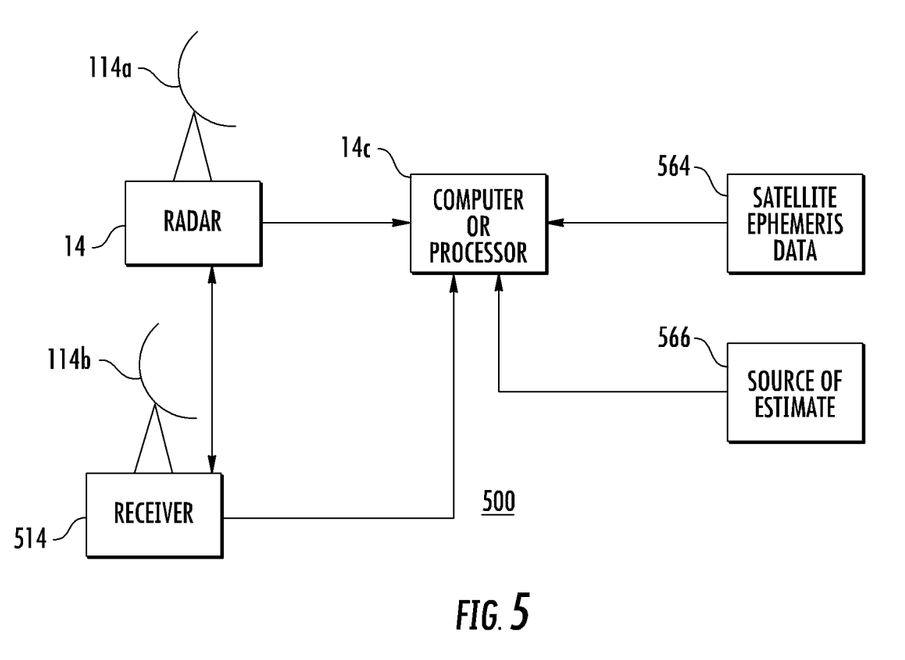
FIG. 5 is a simplified block diagram of a system according to an aspect of the disclosure.

FIG. 5 is a simplified block diagram illustrating a system according to an aspect of the disclosure for determining heading and pitch. In FIG. 5, active radar 14 is coupled to antenna 114a and ancillary radar receiver 514 is coupled to antenna 114b. Radar 14 and receiver 514 are coupled to computer 14c for making available satellite range information. Computer 14c is coupled to a source 504 of satellite ephemerides information and to a source 506 of heading and pitch estimates. Computer 14c is preprogrammed to use the information from the radar and receiver, and from the ephemeris and estimate sources, to determine at least one of the heading and pitch according to aspects of the disclosure.

Figure 6:
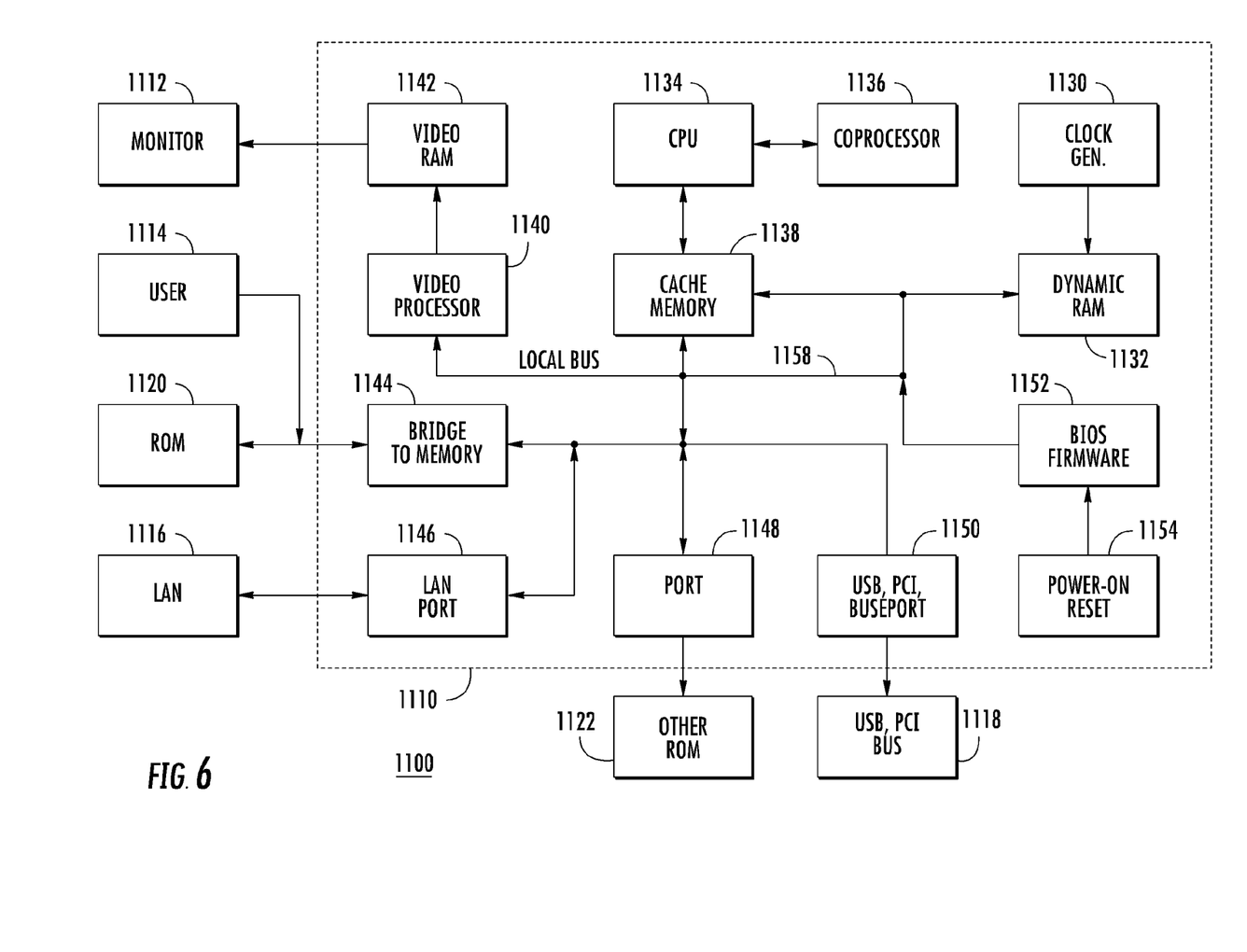
FIG. 6 is a simplified functional block diagram illustrating a computer which may be used for calculations aboard a vehicle.

FIG. 6 is a simplified diagram in block and schematic form illustrating a representative computer which may be used as 14c. In FIG. 6, computer 1100 includes a processor or board 1110 and outboard elements such as a monitor 1112, user controls such as a keyboard and/or mouse, illustrated as a block 1114, local area network (LAN) 1116, additional buses 1118 such as PCI and/or USB, and read-only memory (ROM) 1120, which is ordinarily a hard drive, and additional ROM 1122, which may be, for example, a flash memory stick or capacitance disk (CD). The main portion of the computer processor or board 1110 includes a central processing unit (CPU) 1134, which communicates with a cache dynamic memory 1138. At initial turn-on of the computer 1100, a power-on reset illustrated as a block 1154 enables a preloaded basic input/output system (BIOS) flash memory, which loads cache 1138 with information that initializes the booting sequence by the CPU. When booted, CPU 1134 may communicate with a coprocessor illustrated as 1136, and also communicates with main dynamic memory (DRAM) 1132 and a local bus 1158. Local bus 1158 provides communication between the CPU and other elements of the computer, as for example the video processor 1140 and video random-access memory 1142 for driving a monitor. Local bus 1158 also communicates by way of a bridge 1144 to external ROM 1120 and to user controls 1118. Local bus 1158 further communicates by way of a port 1148 with other ROM 1122 if desired, by way of a USB or PCI bridge or port 1150 with external buses, and/or by way of a local area network (LAN) port 1146 with a LAN 1116. Those skilled in the art will understand how to use one or more computers to perform the processing required by elements of the disclosure.

Other embodiments will be apparent to those skilled in the art. For example, while the system of FIGS. 1A and 1B has been described as having an active radar system with an antenna at location 114a and a radar receiver antenna at location 114b, the active radar antenna could be at location 114b and the radar receiver at location 114a. Similarly, since it is only necessary to know the ranges from the forward and aft locations to the satellites, both the forward and aft antenna locations 114a and 114b could be associated with independent active radar systems; this is disadvantageous because of cost and because of possible interference between the transmissions of the two active radars. The "location" or position of the radar or receiver is deemed to be the position of the associated antenna.

A method according to an aspect of the disclosure is for determining at least one of heading and pitch of a movable platform (112) carrying a radar system (114c) located at one of a forward (114a) and aft (114b) position on the platform (112) and a radar signal receiver located at the other of the forward (114a) and aft (114b) position. The method comprises the step (311) of operating a radar system mounted in a movable platform (112), using both the forward- (114a) and aft-located (114b) systems (antennas), and determining the range and range rate of at least two Earth-orbiting satellites. Satellite ephemerides are obtained. Using a computer (14c), range and range rate equations (300) are generated from data originating from the forward-located and aft-located radar and receiver systems, to thereby generate forward and aft range equations and forward and aft range rate equations. The difference is taken between the forward and aft range equations to thereby form a difference range equation (equation 53). The forward and aft range equations are solved simultaneously to determine the heading and pitch. In a particular mode of this method, the step of simultaneously solving includes the steps of applying a least-squares simultaneous solution.

Thus, a method according to an aspect of the disclosure as illustrated on the greater-than-two-satellite portion of FIG. 4 is for determining at least one of heading and pitch of a movable platform (12) such as a ship. This method comprises the step of operating a radar system (14, 14a) mounted at forward and aft positions (114a, 114b) on the movable platform (12), where the forward and aft positions define a baseline, to measure the ranges (412) of at more than two (>2) satellites (18). Ephemerides for the satellites (18) are obtained (414). Using a computer (14c) and the satellite ephemerides, delta-range equations are set up (418) expressing a baseline vector in terms of the range measurements. A least squares solution is obtained (420) for the heading and pitch (422) using the delta-range equations and the range measurements from the forward and aft locations.

A system according to another aspect of the disclosure relates to FIG. 3 and the satellites-equal-two portion of the flow chart of FIG. 4. This system is for determining at least one of heading and pitch of a movable platform (12). The system comprises a radar arrangement (14, 14a) mounted at forward and aft positions (114a, 114b) on the movable platform (12), where the forward and aft positions define a baseline, the radar arrangement being operable to measure the ranges (412) of at least two satellites (18) from the forward and aft positions. Sources are provided of ephemerides (414)

for the satellites (18) and estimates of the heading and/or pitch. A computer (14c) is coupled to the radar arrangement, to the sources of satellite ephemerides and estimates, for setting up delta-range equations (418) expressing a baseline vector in terms of the range measurements, and for obtaining (420) a least squares solution for the heading and pitch (422) using the delta-range equations and the range measurements from the forward and aft locations.

A method according to another aspect of the disclosure relates to FIG. 3 and to the two-satellite (=2) portion of FIG. 4 is for determining at least one of heading and pitch of a movable platform (12). The movable platform (12) carries a first radar arrangement (14) including an antenna located at one of forward-located (114a) and aft-located (114b) positions and also carries a second radar arrangement including an antenna located at the other one of the forward-located and aft-located positions. The method comprises the step of measuring the range (311, 412) to at least two Earth satellites (18) from the first (114a) and second (114b) radar arrangements, to form measured ranges. The method also comprises the steps of obtaining ephemeris data (312, 414) for the satellites and obtaining (314, 430) an initial estimate of heading and pitch. In a computer process, the method calculates (316, 432) an estimated vector representing a baseline extending between the forward- and aft-located positions, and calculates (318, 434) estimated range differences between the satellites and the forward and aft locations. A geometry matrix is formed (320] from the satellite-ship geometry. A Jacobian matrix is formed (322, 436) representing variation in the baseline vector as a function of heading and pitch. An incremental solution for heading and pitch is obtained from the using the geometry matrix, Jacobian matrix and range measurements. The incremental position is solved, and the estimate of heading and pitch is updated.

A system for determining heading and pitch of a movable platform (12) according to another aspect of the disclosure comprises a radar system (14) located on the movable platform (12), with an antenna (114a) at one of a forward-located (114a) and an aft-located position (114b). The movable platform also carries a radar receiver (514) with an antenna (114b) located at the other one of the forward-located (114a) and aft-located (114b) positions. The radar system (14) and receiver (514) measure the ranges (311, 412) to at least two Earth satellites (18) from the radar (14) and receiver (514), respectively, to form measured ranges. Sources are provided of satellite ephemeris data (564) and of estimate of heading and pitch (566). The system further includes a computer or processor (14c) for, in a computer (14c) process, calculating (316, 432) the estimated baseline vector extending between the forward and aft positions, and estimated range differences between the satellites and the forward and aft locations (318, 434). In the computer process, a geometry matrix is formed (320) from the ship-satellite geometry. A Jacobian matrix is formed (322, 436) representing variation in the baseline vector as a function of the estimated range. In the computer process, an incremental solution (322, 436) for heading and pitch is formed, and the estimated heading and pitch are updated by the incremental solution.

What is claimed is:

1. A method for determining at least one of heading and pitch of a movable platform, said method comprising the steps of:
    operating a radar system in communication with a computer, and having receivers mounted at forward and aft positions on said moveable platform, and having a transmitter mounted on at least one of said forward and aft positions on said movable platform, where said forward and aft positions define a baseline, to measure the ranges of at least two satellites, operating said radar system comprising:
        transmitting a radar signal from an active radar and receiving said first radar signal at said active radar when said radar signal is reflected off of one of said at least two satellites, said active radar mounted at said forward location; and
        receiving by a passive radar receiver said radar signal transmitted by said active radar, wherein said passive radar receiver is mounted at said aft location;
    obtaining from a memory coupled to said computer, pre-stored ephemerides for said satellites; and
    using said computer and said satellite ephemerides, setting up delta-range equations in said computer expressing a baseline vector in terms of range measurements from said forward and aft positions and said at least two satellites, and determining a least squares solution for the at least one of heading and pitch using the delta-range equations and the range measurements from said forward and aft locations,
    wherein said solution for at least one of heading and pitch is determined independently of any off-platform sensors or transmissions.

2. A method for determining heading and pitch of a movable platform carrying a first radar arrangement including an antenna located at one of a forward-located and an aft-located position and also carrying a second radar arrangement including an antenna located at the other one of said forward-located and aft-located positions, said method comprising the steps of;
    transmitting a radar signal from said first radar arrangement at an active radar mounted at a first of said forward-located and said aft-located positions and receiving said radar signal transmitted from said active radar at said first position;
    receiving said radar signal transmitted from said active radar at said second radar arrangement at a passive radar mounted at the other one of said forward-located and aft-located positions;
    measuring by said first and second radar arrangements, the range to at least two Earth satellites from said first and second radar arrangements, to form measured ranges;
    obtaining from a memory in communication with said computer, ephemeris data for said satellites pre-stored in said memory;
    obtaining from a second memory in communication with said computer, an initial estimate of heading and pitch pre-stored in said second memory;
    in a computer process, calculating an estimated vector representing a baseline extending between said forward- and aft-located positions independently of any off-platform sensors or transmissions;
    in said computer process, calculating estimated range differences between said satellites and said forward and aft locations;
    in said computer process, forming a geometry matrix from said ship-satellite geometry;
    in said computer process, forming a Jacobian matrix representing variation in the baseline vector;
    in said computer process, forming an incremental solution for heading and pitch; and
    updating said estimated heading and pitch with said incremental solution.

3. The method of claim 1, wherein a line of sight direction between said forward position and first measured satellite is assumed to be the same line of sight direction between said aft position and said first measured satellite.

4. The method of claim 1, further comprising:
   solving for said baseline vector in the computer by performing the steps of:
   solving for the baseline vector in the moveable platform's navigation reference frame;
   comparing said baseline vector in the moveable platform's navigation reference frame to the baseline's position in the platform's body frame;
   determining the moveable platform's heading in said navigation reference frame based on said comparison.

5. The method of claim 4, wherein said navigation reference frame is a East-North-Up (ENU) reference frame.

6. The method of claim 1, wherein said solution for at least one of heading and pitch is further determined independently of Earth's magnetic field.

7. The method of claim 1, further comprising:
   in said computer, applying a weight matrix containing a covariance of said delta-range equations based on an uncertainty of the delta-range measurement for each of the at least two satellites to said delta range equations to favor more accurate range measurements over less accurate range measurements.

8. The method of claim 1, wherein the determination of the pitch of the moveable platform is performed when said receivers of said radar platform mounted at said forward and aft positions, are located on a roll axis of said moveable platform.

9. The method of claim 1, wherein a delta range is defined as a difference in range between a first satellite and said first radar receiver mounted at said forward position, and between said first satellite and said second radar receiver mounted at said aft position.

10. A system for determining at least one of heading and pitch of a movable platform, said system comprising:
    a radar arrangement mounted at forward and aft positions on said movable platform, where said forward and aft positions define a baseline, said radar arrangement being operable to measure the ranges of at least two satellites, said radar arrangement comprising:
    an active radar including a first radar antenna configured to transmit a radar signal and to receive said first radar signal when said radar signal is reflected off of one of said at least two satellites, said first radar antenna mounted at said forward location; and
    a passive radar receiver including a radar antenna configured to receive said radar signal transmitted by said active radar, wherein said passive radar receiver antenna is mounted at said aft location;
    a computer coupled to said radar arrangement;
    a memory having pre-stored therein ephemerides for said satellites, said memory coupled to said computer; and
    a second memory containing estimates of heading and pitch of said moveable platform, wherein said computer is configured to set UP delta-range equations expressing a baseline vector in terms of range measurements from said forward and aft positions and said at least two satellites independently of any off-platform sensors or transmissions, and for obtaining a least squares solution for the at least one of heading and pitch using the delta-range equations and the range measurements from said forward and aft locations.

11. A system for determining at least one of heading and pitch of a movable platform, said system comprising:
    a radar arrangement mounted at forward and aft positions on said movable platform, where said forward and aft positions define a baseline, said radar arrangement being operable to measure the ranges of at least two satellites, said radar arrangement comprising:
    a first active radar including a first radar antenna configured to transmit a first radar signal and to receive said first radar signal when said first radar signal is reflected off of one of said at least two satellites, said first active radar antenna mounted at said forward location; and
    a second active radar including a second radar antenna configured to transmit a second radar signal and to receive said second radar signal when said second radar signal is reflected off of one of said at least two satellites,
    wherein said second active radar antenna is mounted at said aft location;
    a computer coupled to said radar arrangement;
    a memory having pre-stored therein ephemerides for said satellites, said memory coupled to said computer; and
    a second memory containing estimates of heading and pitch of said moveable platform, wherein said computer is configured to set UP delta-range equations expressing a baseline vector in terms of range measurements from said forward and aft positions and said at least two satellites independently of any off-platform sensors or transmissions, and for obtaining a least squares solution for the at least one of heading and pitch using the delta-range equations and the range measurements from said forward and aft locations.

12. The method of claim 2, wherein determining at least one of heading and pitch of the moveable platform further comprises:
    receiving, from memory coupled to said computer, said initial estimate of at least one of heading and pitch of the moveable platform;
    iteratively performing the computer steps of:
    loading satellite ephemerides from a source coupled to said computer;
    obtaining delta range measurements from each of said forward and aft positions to each of said at least two satellites;
    computing estimated delta range measurements from each of said forward and aft positions to each of said at least two satellites based on said initial estimate;
    comparing said obtained delta range measurements to said estimated delta range measurements;
    computing a geometry matrix comprising a set of linearized range equations;
    solving for an incremental estimate of at least one of heading and pitch.

13. The method of claim 12, further comprising limiting the number of iterations to a predetermined number.

14. The method of claim 12, wherein said iterative repeating comprises stopping the iterations when the solved incremental heading and pitch estimate differs from a previously solved incremental heading and pitch estimate by less than a pre-determined threshold value.

15. The method of claim 2, wherein said measuring by said first and second radar arrangements is performed between said forward-located and aft-located positions to exactly two Earth satellites.

16. A system for determining heading and pitch of a movable platform, said system comprising:
    a radar system located on said movable platform at one of a forward-located and an aft-located position, and also carrying a radar receiver located at the other one of said forward-located and aft-located positions, said radar system and receiver measuring the ranges to at least two Earth satellites from said radar and receiver, respectively, to form measured ranges independently of any off-platform sensors or transmissions, said radar system comprising;
- an active radar including a first radar antenna configured to transmit a radar signal and to receive said radar signal when said radar signal is reflected off of one of said at least two satellites, said active radar antenna mounted at said forward location; and
- a passive radar receiver including a radar antenna configured to receive said radar signal transmitted by said active radar,
- wherein said passive radar receiver antenna is mounted at said aft location;
- a computer coupled to said radar system and said radar receiver;
- a memory having pre-stored therein satellite ephemeris data for said at least two Earth satellites, said memory coupled to said computer; and
- a second memory having pre-stored therein an initial estimate of heading and pitch coupled to said computer;
- wherein, said computer is configured to calculate estimated range differences between said satellites and said forward and aft locations, to form a geometry matrix from said ship-satellite geometry, to form a Jacobian matrix representing variation in said baseline vector as a function of said estimated range, to form an incremental solution for heading and pitch, and to update said estimated heading and pitch with said incremental solution.

17. A system for determining heading and pitch of a movable platform, said system comprising:
- a radar system located on said movable platform at one of a forward-located and an aft-located position, and also carrying a radar receiver located at the other one of said forward-located and aft-located positions, said radar system and receiver measuring the ranges to at least two Earth satellites from said radar and receiver, respectively, to form measured ranges independently of any off-platform sensors or transmissions, said radar system comprising;
  - a first active radar including a first radar antenna configured to transmit a first radar signal and to receive said first radar signal when said first radar signal is reflected off of one of said at least two satellites, said first active radar antenna mounted at said forward location;
  - a second active radar including a second radar antenna configured to transmit a second radar signal and to receive said second radar signal when said second radar signal is reflected off of one of said at least two satellites, said second active radar antenna mounted at said aft location;
- a computer coupled to said radar system and said radar receiver;
- a memory having pre-stored therein satellite ephemeris data for said at least two Earth satellites, said memory coupled to said computer; and
- a second memory having pre-stored therein an initial estimate of heading and pitch coupled to said computer;
- wherein, said computer is configured to calculate estimated range differences between said satellites and said forward and aft locations, to form a geometry matrix from said ship-satellite geometry, to form a Jacobian matrix representing variation in said baseline vector as a function of said estimated range, to form an incremental solution for heading and pitch, and to update said estimated heading and pitch with said incremental solution.

18. The system of claim 16, wherein said measuring by said first and second radar arrangements is performed between said forward-located and aft-located positions to only two Earth satellites.

* * * * *